(12) United States Patent
Buse et al.

(10) Patent No.: US 6,844,946 B2
(45) Date of Patent: Jan. 18, 2005

(54) TUNABLE HOLOGRAPHIC FILTER

(75) Inventors: Karsten Buse, Bonn (DE); Demetri Psaltis, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 213 days.

(21) Appl. No.: 09/823,173

(22) Filed: Mar. 29, 2001

(65) Prior Publication Data

US 2001/0028483 A1 Oct. 11, 2001

Related U.S. Application Data

(60) Provisional application No. 60/193,583, filed on Mar. 30, 2000.

(51) Int. Cl.$^7$ ................................................ G02B 5/32
(52) U.S. Cl. ............................. 359/15; 359/1; 359/35; 359/3; 385/16; 385/37; 385/24
(58) Field of Search .......................... 359/15, 1, 3, 35, 359/22; 385/16–23, 37, 24

(56) References Cited

U.S. PATENT DOCUMENTS

| | | |
|---|---|---|
| 4,813,756 A | 3/1989 | Frenkel et al. |
| 5,272,550 A | 12/1993 | Dickson et al. |
| 5,488,500 A | 1/1996 | Glance |
| 5,488,679 A | 1/1996 | Wu |
| 5,506,920 A | 4/1996 | Suemura et al. |
| 5,566,014 A | 10/1996 | Glance |
| 5,606,439 A | 2/1997 | Wu |
| 5,646,399 A | 7/1997 | Fukushima et al. |
| 5,684,632 A | 11/1997 | Shimizu |
| 5,737,104 A | 4/1998 | Lee et al. |
| 5,781,268 A | 7/1998 | Liu et al. |
| 5,781,332 A | 7/1998 | Ogata |
| 5,781,341 A | 7/1998 | Lee |
| 5,917,626 A | 6/1999 | Lee |
| 5,937,115 A | 8/1999 | Domash |
| 6,111,997 A | 8/2000 | Jeong |
| 6,157,025 A | 12/2000 | Katagiri et al. |
| RE37,044 E | 2/2001 | Wu |
| 6,192,174 B1 | 2/2001 | Lee |
| 6,567,573 B1 * | 5/2003 | Domash et al. ............... 385/16 |

* cited by examiner

*Primary Examiner*—Fayez Assaf
(74) *Attorney, Agent, or Firm*—J. D. Harriman, Esq.; Coudert Brothers LLP

(57) ABSTRACT

An optical add/drop filter is formed using a hologram which is tuned to a wavelength in an optical signal. The diffraction condition of the hologram may be varied to vary the in add or drop content.

50 Claims, 4 Drawing Sheets

INTENSITY OF THE TRANSMITTED LIGHT

TUNABLE HOLOGRAPHIC FILTER

CROSS REFERENCE TO RELATED APPLICATIONS

This application claims the benefit of the U.S. Provisional Application No. 60/193,583, filed Mar. 30, 2000.

BACKGROUND

Many different applications operate using optical techniques. Optical techniques allow many different wavelengths to be multiplexed on the same fiber. Each wavelength can represent a separate data stream. In some applications, it may be desirable to obtain parts of said data stream from the waveguide without obtaining other parts of the data stream from the waveguide. It may also be desirable to add new multiplexed data to the optical stream already present on the waveguide.

An add/drop multiplexer is often used to carry out the addition or removal of channels from an optical signal in a waveguide such as a fiber. Different kinds of add/drop multiplexers are known.

SUMMARY

The present application teaches a tunable technique which allows adding and/or dropping a wavelength channel in a waveguide such as a fiber.

A technique disclosed according to the present application operates by use of a hologram which preferentially changes some characteristic of one or more wavelengths of the optical signal without correspondingly changing other wavelengths of the same optical signal. Some aspect of the hologram is tunable in order to select a different wavelength/channel for changing.

BRIEF DESCRIPTION OF THE DRAWINGS

These and other aspects of the invention will be described in detail with reference to the accompanying drawings, wherein.

DETAILED DESCRIPTION

Figure 1:
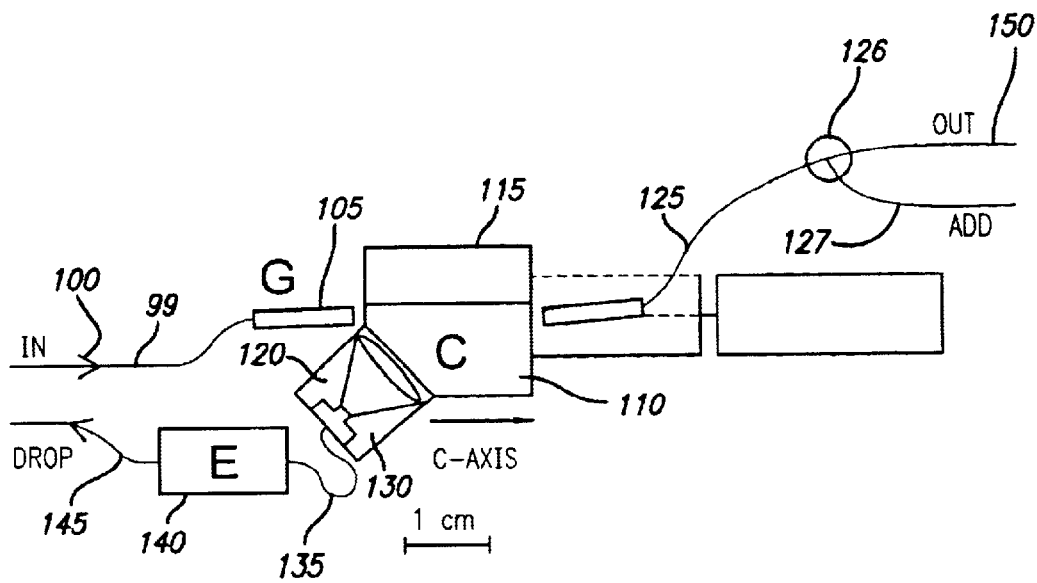
FIG. 1 shows an embodiment of a tunable add/drop multiplexer where the hologram is rotatable.

FIG. 1 shows a first embodiment of a technique which uses a reflection hologram, which allows tunable selection of channels to be removed from a waveguide. The waveguide can be a fiber or other optical-signal-containing element.

The input signal 100 initially travels in the input waveguide 99. The input signal 100 is applied via an optical element 105 which may be a GRIN lens, and to a material 110 which includes a hologram 115 recorded in a holographic recording material, which may be, for example, a photorefractive crystal. The hologram that is formed may be a grating in that crystal.

Light is diffracted only if the Bragg matching condition is satisfied. The light wavelength $\lambda$ should fulfill the relation $$\lambda \propto 2n\Lambda,$$

where n is the averaged refractive index of the holographic storage material and $\Lambda$ is the effective period length of the holographic grating, for reflection holograms. For transmission holograms, the relation $\lambda \propto 2\Lambda$ is followed. The effective period length $\Lambda$ is the distance between two fringes of the grating along a line that is parallel to the incoming light beam.

The recorded hologram is rotated around an axis that is shown by the dotted line in FIG. 1. Tunability of the add/drop multiplexer is achieved by changing the effective period length $\Lambda$ by changing the rotational position of the grating. As this rotational position changes, the light travels in a different direction with regard to the holographic structure stored in the recording material. For incidence perpendicular to the fringes of the holographic grating, a small period length is present and small wavelengths are diffracted. In contrast, for non-perpendicular incidence, the effective period length of the gratings is increased and hence light of larger wavelengths is diffracted.

The wavelength which matches the Bragg condition of the hologram 115 is reflected through an optical system 120. The hologram 115 is rotated to select the desired selected wavelengths, i.e., to tune the reflected signal wavelength. The wavelengths which do not match the hologram are transmitted through the crystal 110 substantially unattenuated, and coupled into the output waveguide 125. The output waveguide is coupled to a "y junction" 126 which receives signals/wavelengths to be added from an "add" port 127. The final output waveguide 150 includes the filtered signal from 125, and the add signal from 127.

As an alternative to using an "Y" junction to add light of the desired wavelength, it may also be possible to use the hologram itself for the "add" function, i.e., to add to the element 125 a second beam that is Bragg matched to the grating for the wavelengths that should be added to the data stream.

The reflected channel, after passing through optical system 120, may be directed to a detector 130 which converts the optical signal into an electronic signal 135 to be used by an electronic device 140. This device may also include a DFB laser to re-modulate the signal. This signal 145 corresponds to the information in the "dropped" output channel.

Hence, the same device can be used for either an add function, or for a drop function. By doing both operations, the device can be used for both adding and drop.

For the add function, the detection system 120, 130, 135, 140, and 145 is replaced by an incoming light beam. The channel "Out" becomes "In" and vice versa. Such an "add" coupler would have the advantage that light is coupled in only if the selected wavelength is Bragg matched to the tunable holographic filter.

Replacing the electronic detection system 120, 130, 135, 135, 140, and 145 by an optical system as described above and using this port as an drop device and utilizing the optical add function as described above in the section describing alteratives to the "y" junction yields an all-optical tunable add-drop multiplexer.

The device of this embodiment is called an "add-drop" multiplexer. However, any other application where frequencies are added or dropped, including filters, and the like, may also be used. Further modifications of the setup shown in FIG. 1 are possible. However, these modifications may still allow tunability by a mechanical change of the effective period length of the holographic grating.

Figure 2:
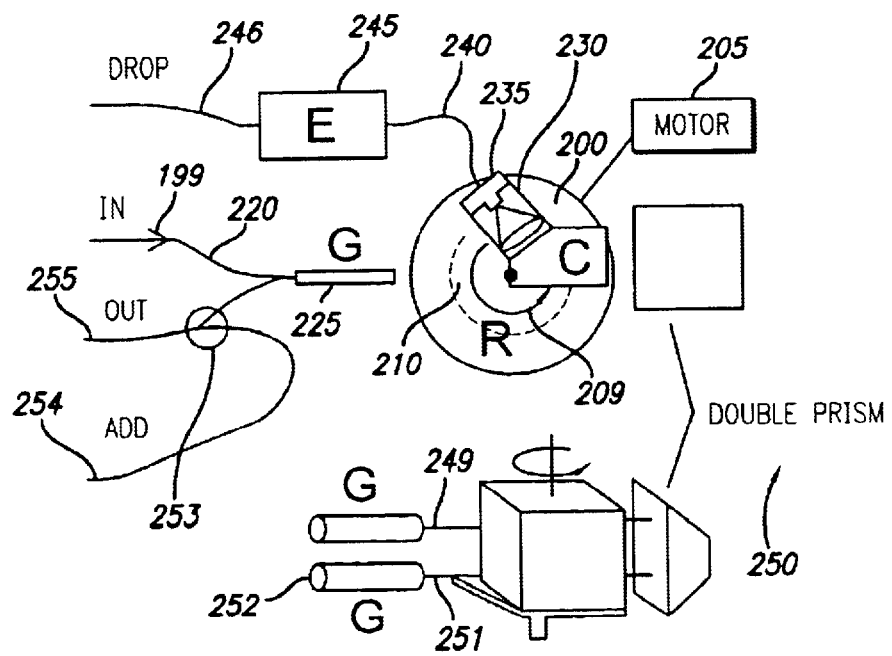
FIG. 2 shows a different embodiment of a tunable add/drop multiplexer where the hologram is also rotatable.

Another embodiment is shown in FIG. 2. The wavelength which is dropped in this embodiment is selectable as in the above embodiments. In the embodiment of FIG. 2, the storage material 200 includes a hologram 210, e.g., in the form of a grating. A rotation element 205 is provided to rotate the crystal in a way such that the effective period length Λ of the hologram is changed and by these means the Bragg condition is changed, as is explained above.

In this embodiment, the optical signal 199 is input from the fiber 220 to an optical system 225 which may include a GRIN lens. The output of the GRIN lens is directed at the hologram 210. As in the embodiment of FIG. 1, the wavelength which matches the characteristic of the hologram 210 is diffracted to optical system 230, detected by detector 235, and coupled as signal 240 to electronic amplifier 245. The output signal 246 becomes a signal including the information from the dropped wavelength.

The direction of movement of the crystal need not be circular as explained above, but rather could be of any shape. The motor which moves the crystal can then be a linear stepper motor or a DC servo motor, or other device that can move the position of the holographic recording material.

All other wavelengths, which do not correspond to the information in the hologram 210 are passed through the hologram. The output signal-passed elements may be sent to a double prism 250 which retro-reflects the passed light 249 as light 251, which travels in the same direction as light 249, but in the opposite direction. The light 251 may pass another GRIN lens 252 to a y junction 253 which combines with new light from an add port 254. The composite output 255 then corresponds to light with the selected wavelength dropped and light from the add port 254.

As in the above, the "y" junction may be replaced by a coupler that couples the light out of the "in" fiber and that directs the light onto the hologram in such a way that it is Bragg matched and collected by the element 252. Also as described above, the electronic detection system may be replaced by an optical system that couples the light, to name one example, back into a fiber. Applying both changes yields again an all-optical tunable add-drop multiplexer.

Further modifications of the setup shown in FIG. 2 are possible. All modifications, however, may achieve tunability of frequency by a mechanical change of the effective period length of the holographic grating. The major difference to FIG. 1 is the orientation of the axis of the mechanical rotation of the hologram. In FIG. 1, the axis is in the paper plane while in FIG. 2 it is perpendicular to the paper plane. However, other rotational axes are possible as well.

Figure 3:
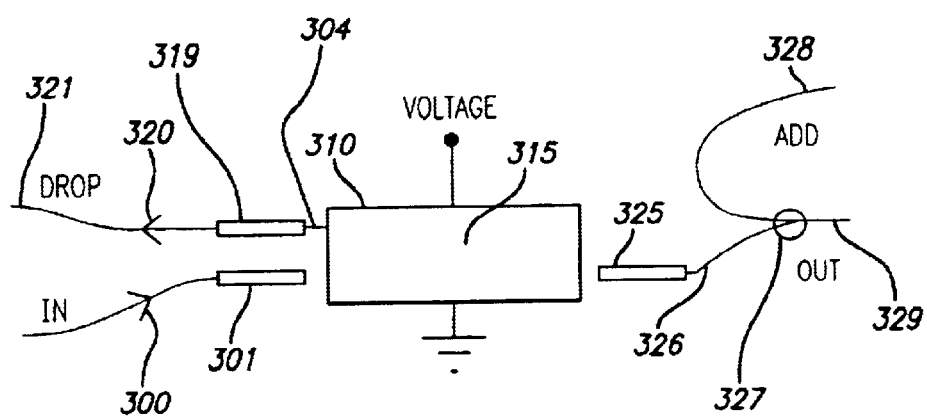
FIG. 3 shows an electrically tunable holographic add/drop multiplexer.

An alternative embodiment shown in FIG. 3 allows tuning using an electrically-alterable hologram. Any of a number of different various materials may be used, including electro-optic crystals and electro-optic polymers. The material has a hologram formed thereon as a fixed reflection grating, with a length and orientation. The holographic storage material may be formed of any material where the refractive index can be changed by application of an electric field. For example, this may include electro-optic polymers, liquid-crystal dispersed polymers, and electro-optic oxide crystals such as lithium niobate, barium titanate, potassium niobate, strontium-barium niobate mixed, and potassium-tanatalate niobate mixed crystals. In general, any material which can be used to make a hologram, and which has a variable refractive index can be used.

The refractive index of the crystal may be changed by an external electric field. The refractive index may vary, for example, between 1.35 and 1.45. By varying the refractive index, the effective length, and hence the Bragg wavelength, can be changed. The same formula as it was given above applies: $\lambda \propto 2n\Lambda$. By tuning the refractive index n, the wavelength of the reflected light λ is correspondingly tuned. In this way, certain information is reflected based on its wavelength, while other optical information is allowed to pass.

In operation, the signal 300 passes through the optical system 301 into the material 310. The material 310 is formed with a hologram 315 in the shape of a diffraction grating. Wavelengths within the signal 300 that match certain conditions in the grating are reflected as 304, and output through optical system 319 on to fiber 320. This forms the drop channel 321. Information which does not correspond to the frequency in the grating is passed to the output fiber 325 as signal 326. A "y" junction 327 allows another signal 328 to be added from an add port to form the composite signal 329.

In operation, the Bragg wavelength can be changed to render the device tunable, to change the dropped signal 321. As explained above, the "y" junction might be replaced by an additional waveguide with a coupler that directs the light onto the hologram that it is diffracted into the "out" channel. This yields an all-optical tunable add-drop multiplexer. Further modifications of the setup are possible. However, the key feature is always the same: The effective optical period length of the holographic grating is changed by a change of the refractive index n while the mechanical effective period length Λ of the diffraction grating is kept constant.

Figure 4:
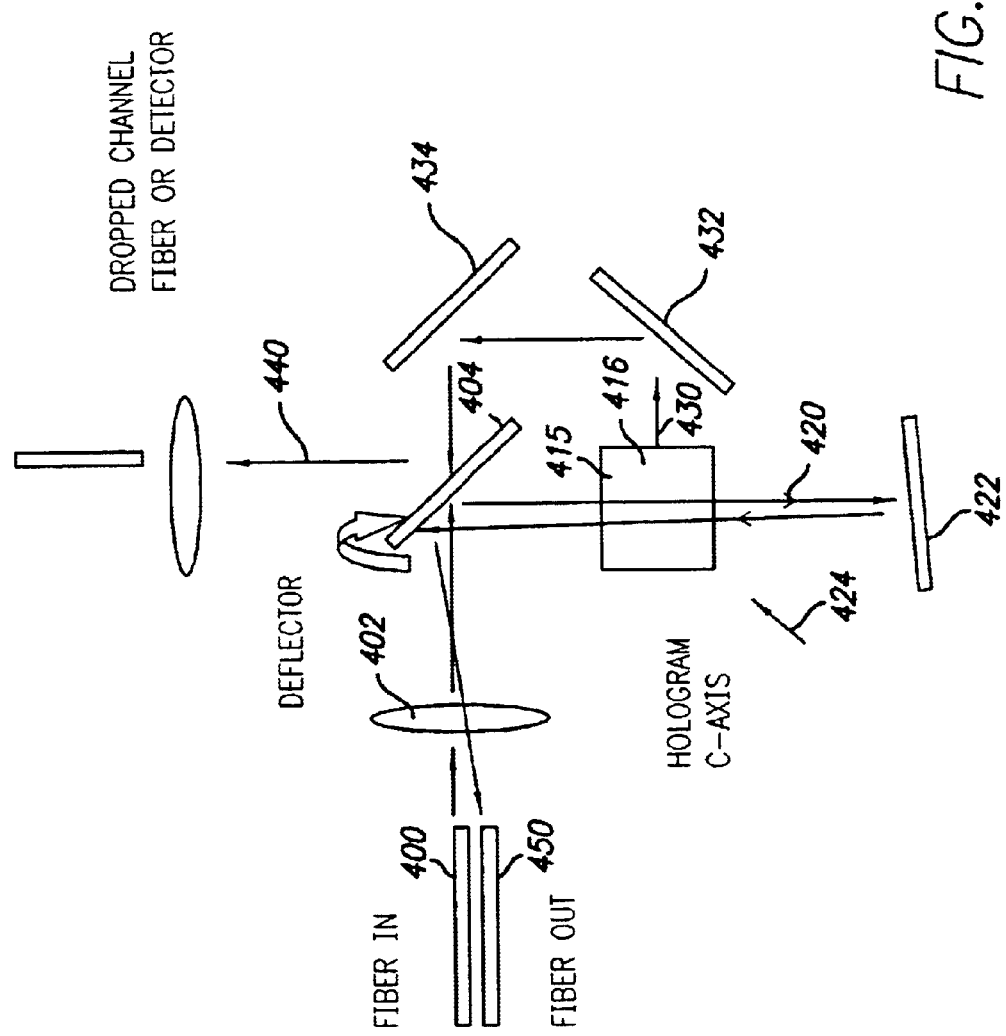
FIG. 4 shows an embodiment of a tunable add/drop multiplexer using a moving mirror.

An embodiment shown in FIG. 4 uses a moving mirror to change the angular relation between the incoming light beam, and the hologram. In contrast to the FIGS. 1 and 2, however, this embodiment changes the direction of the incoming light beam while the holographic grating stays mechanically in a fixed position. An advantage is that the dropped light will always travel in the same direction based on the direction of the hologram grating. Also, since the mirror may have less mass than the hologram, selection may be carried out faster.

In this embodiment, the input signal 400 is coupled to a lens 402 and to a movable mirror 404 which directs the input light to the hologram element 415. Light which does not correspond to the resonant frequency of the hologram is passed as 420. The passed light is then reflected by reflection element 422, and returned on path 424, via the mirror 404, and to the output fiber 450. Note that the output fiber 450 is in substantially the same orientation and direction as the input fiber 400. The movable first mirror 404 is used as parts of both the optical system for the output (first side of the mirror) and for the dropped output (second side of the mirror).

The light which does fulfill the Bragg condition is diffracted as 430, to a retro-reflector array 432, 434, and is reflected by the mirror 404, and output as an output signal 440. Signal 440 includes the information from the dropped channel. In this way, the input and output signals may travel in different directions with the output traveling in a direction substantially perpendicular to the input. The mirror 404 may be rotated as shown to change the area 416. An optical add port can the introduced simply by placing nearby the fiber for the drop channel a fiber for the add channel. The "add" light will travel in the reciprocal direction to the beam 440, will be reflected from the mirrors 404, 434, and 432, will be diffracted from the hologram, reflected from mirror 404 and coupled into the output channel 450.

Combinations of the tuning mechanisms that are disclosed in the FIGS. 1 to 4 are also possible. One example is rough-tuning by mechanical rotation and fine-tuning by external electrical fields.

Figure 5:
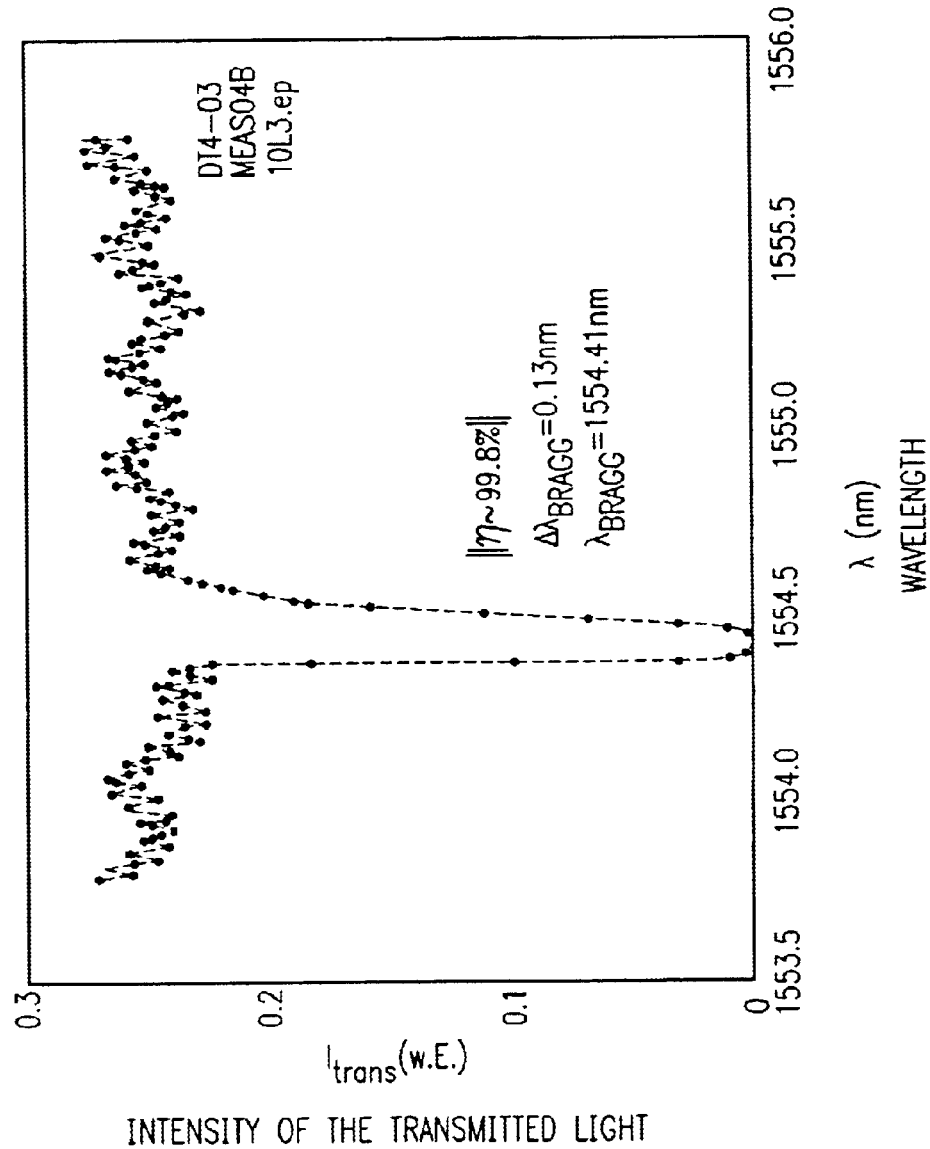
FIG. 5 shows an intensity chart.

FIG. 5 shows a plot with the diffraction efficiency of the hologram as a function of wavelength. 99.8 percent of the transmitted light may be diffracted over the chosen range of wavelengths. Of course, these results are merely exemplary, and in other embodiments it may be acceptable to have less efficiency.

For example, the above has described the waveguides being optical fibers. Of course, any kind of waveguide which is capable of containing and passing light may be used, including, but not limited to, a waveguide formed on a semiconductor chip.

In the description the terms "Bragg condition" and diffracted light wavelengths" and "diffraction grating" and related expressions are used. The invention covers all different kinds of gratings which are known in the art, including gratings with spatially varying amplitude ("apodized gratings") and gratings with spatially varying fringe spacing ("chirped gratings").

Other embodiments are within the disclosed invention.

What is claimed is:

1. A tunable optical device, comprising:
    a holographic element, having a single hologram therein which has a predetermined relationship to a plurality of wavelengths;
    a wavelength varying element, wherein said wavelength varying element includes an element which physically moves said single hologram, and wherein said wavelength varying element is coupled to said holographic element, and varying said predetermined relationship; and
    a first optical system, handling first wavelengths of an optical signal which pass through said holographic element without being changed by said single hologram as an output signal; and a second optical system, separate from said first optical system, and handling a second optical signal including said plurality of wavelengths having said predetermined relationship as varied by said wavelength varying element.

2. A device as in claim 1, wherein said second optical system handles wavelengths to be dropped.

3. A device as in claim 2, wherein said holographic element includes a single hologram form therein which includes a plurality of different Bragg matching conditions depending on an angle of incidence with respect to an orientation of the single hologram, and said wavelength varying element includes an element which physically moves said single hologram to apply said optical signal through a different orientation of said single hologram which has different Bragg matching characteristics.

4. A device as in claim 3 wherein said physically moving comprises rotating said single hologram.

5. A device as in claim 4 wherein said rotating comprises rotating said single hologram to form a section of a cone.

6. A device as in claim 2 wherein said second optical signal is a drop output signal which travels in a different direction than either an input signal or said output signal.

7. A device as in claim 2 further comprising an add port, allowing additional wavelengths to be added to the output signal.

8. An device as in claim 7, wherein said add port comprises a Y junction.

9. A device as in claim 7, wherein said second optical signal travels in substantially a same direction as said first optical signal.

10. A device as in claim 7, wherein said second optical signal travels in a direction which is substantially 180 degrees opposite from said first direction.

11. A device as in claim 1, wherein said output signal extends in substantially a same direction as an input signal.

12. A device as in claim 11, further comprising a double prism forming a retroreflecting operation to reflect the output signal in said opposite direction.

13. A device as in claim 1, wherein said output signal travels in substantially an opposite but parallel direction to an input signal.

14. A device as in claim 1, further comprising an optical detector, receiving said drop signal, and converting said drop signal to an electrical signal indicative thereof.

15. A device as in claim 14, further comprising a laser element, receiving said electrical signal and converting said electrical signal to an optical signal.

16. An apparatus as in claim 15 wherein said laser is a DFB laser.

17. A device as in claim 1, wherein said single hologram comprises a light diffracting structure.

18. A device as in claim 1, wherein said holographic element includes a single hologram form therein which includes a plurality of different Bragg matching conditions depending on an angle of incidence with respect to an orientation of the single hologram, and said wavelength varying element includes an element which physically moves a direction of an input light beam relative to said single hologram to apply said optical signal through a different orientation of said single hologram which has different Bragg matching characteristics.

19. A device as in claim 1, wherein said second optical system handles wavelengths to be added.

20. A device as in claim 1, wherein said holographic element includes said single hologram forming a grating as part of said holographic element, said grating interacting with a wavelength based on a characteristic of a material forming said holographic element.

21. A device as in claim 1, wherein said first optical signal travels in a different direction than said second optical signal.

22. A device as in claim 1, wherein said first optical system includes a lens.

23. A device as in claim 22, wherein said lens is a GRIN lens.

24. A method for multiplexing wavelengths, comprising:
    applying an input optical signal having a plurality of wavelengths therein to an area of a single hologram;
    tuning said single hologram to one of said plurality of wavelengths; and
    adjusting said single hologram to separately optically process said one of said wavelengths differently from others of said wavelengths.

25. A method as in claim 24, wherein an output signal includes all wavelengths except said one of said wavelengths and producing a dropped signal including only said one of said wavelengths.

26. A method as in claim 25, further comprising changing a direction of said dropped signal using said hologram.

27. A method as in claim 24, wherein said adjusting comprises physically moving said single hologram.

28. A method as in claim 24, further comprising using said hologram to merge said one of said wavelengths as added signal with others of said wavelengths as an output signal.

29. A method as in claim 24, wherein an optical output signal travels in substantially a same direction as said input optical signal.

30. A method as in claim 24, wherein a first optical output signal including said one of said wavelengths travels in substantially an opposite direction from an input optical signal.

31. A method as in claim 24, wherein a first optical output signal including said others of said wavelengths and a second optical output signal including said one of said wavelengths travel in different directions.

32. A method as in claim 31, wherein said first and second output signals have a constant angle there between.

33. A method as in claim 24 wherein said adjusting comprises changing a direction of said one of said plurality of wavelengths to a different direction than another of said plurality of wavelengths.

34. A method as in claim 24, wherein said tuning comprises moving said single hologram.

35. A method as in claim 24, wherein said tuning comprises moving said incident light to a different angle.

36. A method as in claim 24, further comprising adding an additional optical wavelength to said output signal.

37. An apparatus, comprising:

an optical filter element comprising a hologram material with a single hologram form thereon;

an optical system, positioned to apply an optical signal to said single hologram; a tuning element, wherein said tuning element changes by moving said single hologram, and wherein said tuning element changing a way that said optical signal is applied to said single hologram to change a Bragg matching condition between said optical signal and said single hologram and thereby Bragg match to a different resonant wavelength in said optical signal;

a first output path for light that is not Bragg matched to said single hologram extending in a first direction, and a second output path for light that is Bragg matched to said single hologram of extending along a second optical path, wherein said second optical path is in a different direction than said first optical path.

38. An apparatus as in claim 37, wherein said moving said single hologram moves said hologram in a way which forms a substantially cone shape.

39. An apparatus as in claim 37, further comprising an add port, which allows adding additional wavelengths to the output signal.

40. A device, comprising:

a holographic material, including a single holographic grating formed therein;

an optical system, providing an input optical beam to said holographic material, and obtaining an output optical beam from said holographic material, said input and output optical beams being different; and a tuning system, wherein said tuning system comprises an element which mechanically rotates said holographic material, and wherein said tuning system tunes the way in which said input and output beam are different by varying an effective period length of a said single holographic grating.

41. A device as in claim 40, wherein said output optical beam includes a first output optical beam and a dropped optical beam, extending in different directions, said first output optical beam having at least one frequency band removed relative to said input optical beam.

42. A device as in claim 40, wherein said input optical beam includes a first input optical beam, and a second input optical beam with at least one wavelength range to be added to contents of said first input optical beam, said first and second input optical beams coming from different directions.

43. A device as in claim 40, wherein said input optical beam and said output optical beam have parts which extend in substantially the same directions.

44. A device, comprising:

a holographic storage element, formed with a single hologram therein in the shape of a grating; and an optical tuning element, wherein said optical tuning element operates to change a mechanical orientation of said holographic storage element, and wherein said optical tuning element tuning an operation of said holographic storage element to react to different optical frequencies.

45. A device as in claim 44, further comprising an optical system, coupling an input optical beam to said single hologram.

46. A device as in claim 45, wherein said optical system includes an input optical fiber, an output optical fiber, and a dropped output optical fiber, wherein said single hologram operates to diffract said different optical frequencies selected by said optical tuning element, to said dropped output optical fiber.

47. A device as in claim 46, wherein said optical system includes a double prism, which reflects an output optical signal back in the direction of its incidence, said double prism located in a direction where it will not contact a dropped optical signal for said dropped output optical fiber.

48. A device as in claim 45, further comprising a repeater element, receiving an output optical signal, converting said output optical signal to an electrical signal, and reconverting said electrical signal to an optical signal.

49. A device as in claim 44, wherein said optical tuning element operates to change an optical angle of incidence of an input optical signal.

50. A device as in claim 44, wherein said optical tuning element changes an effective period length of the holographic grating.

* * * * *